Dec. 17, 1957  P. C. MARTIN  2,816,750
FISHING SCALE
Filed Feb. 20, 1956
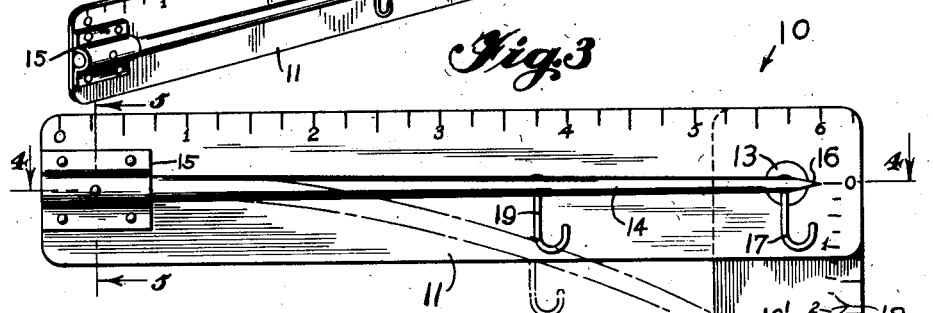
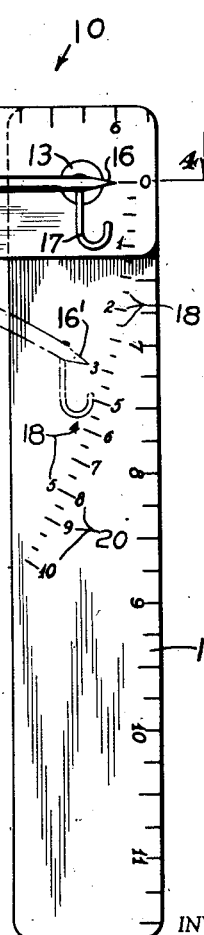
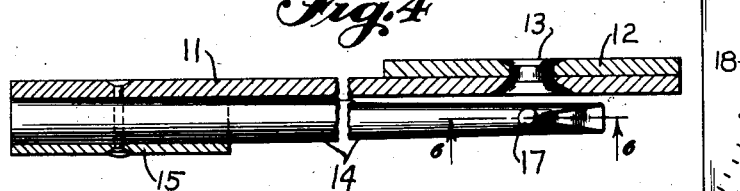
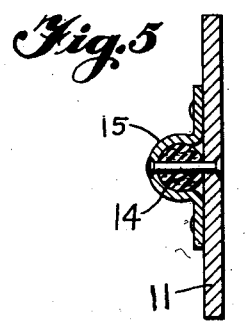
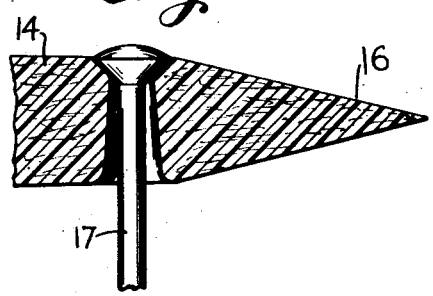
INVENTOR
Philip C. Martin
BY Beale & Jones
ATTORNEYS – # United States Patent Office 2,816,750
Patented Dec. 17, 1957

2,816,750

FISHING SCALE

Philip C. Martin, Concord, N. H.

Application February 20, 1956, Serial No. 566,576

1 Claim. (Cl. 265—63)

My invention is a device for weighing and measuring the length of objects, for example fish.

It is desirable for a fisherman to have means for measuring the weight and length of fish caught, particularly in localities where there are restrictions on the size of a catch. Although devices for this purpose have been developed, all those with which I am familiar have some objectionable feature, such as being too bulky, too expensive to manufacture, or lacking in ruggedness or convenience.

It is an object of my invention to provide an inexpensive, rugged, compact and thoroughly practical weighing device which is particularly adapted to use by fishermen. Another object is to provide a foldable weighing and measuring device of novel construction.

Other objects will be apparent from the following description and the accompanying drawings, wherein:

Figure 1 is a perspective view of a combined weighing and measuring device made in accordance with my invention, shown in its folded position;

Figure 2 is a perspective view of the same in its extended, or length measuring position;

Figure 3 is a front elevation of the same in its weighing position;

Figure 4 is a sectional view taken on line 4—4 of Fig. 3;

Figure 5 is a sectional view taken on line 5—5 of Fig. 3; and

Figure 6 is a sectional view taken on line 6—6 of Fig. 4.

Referring now to the drawings, wherein like characters refer to the same parts, there is shown a novel fishing scale made in accordance with my invention, generally designated 10, comprising a first strip 11, and a second strip 12 pivotally connected thereto, adjacent a pivoted end of each, by a pivot 13.

Scale 10 has a folded position (Fig. 1) in which strips 11 and 12 extend in the same direction from pivot 13 with strip 11 overlying strip 12, a length measuring position (Fig. 2) in which strips 11 and 12 extend in opposite directions from pivot 13, and a weighing position, illustrated in Fig. 3, in which strip 11 is disposed horizontally and strip 12 extends downwardly therefrom.

Length measuring graduations extend along the upper edges of strips 11 and 12 for measuring the length of an object, such as a fish, when scale 10 is in its length measuring position.

A spring beam 14 is rigidly fastened as at 15 to the front face of strip 11 at the end thereof opposite pivot 13, and extends along, and otherwise free of said strip, terminating in a free end 16 adjacent pivot 13. Adjacent the free end 16 there is an object support device 17 on the beam. This preferably takes the form of a hook, as illustrated, but may be a notch, or simply a marked point of said beam on which to hang an object to be weighed, and my claims are to be interpreted broadly in this respect.

Strip 12 has weight graduations 18 thereon along the path traversed by free end 16 when it is deflected by a load, such as illustrated in broken lines in Fig. 3 at 16'. The weight graduations are calibrated so as to indicate the weight of an object supported at 17 corresponding to the deflected position of free end 16.

Preferably, a second load support means 19 is provided intermediate the ends of beam 14 for increasing the weighing capacity of my device. Means 19 may be positioned so as to reduce the deflection of beam 14 under a given load to one-half the deflection of the same load when it is supported at 17, thereby doubling the scale of graduations 18; or separate graduations 20 may be provided.

If desired, additional graduated length measuring strips may be pivotally connected to the end of strip 12 opposite pivot 13. On the other hand, length measuring graduations may be omitted if the device is intended to be used only for weighing.

I prefer to use aluminum strips for members 11 and 12 and for fastening attachment 15, and a glass-fiber reinforced plastic rod, of the kind now commonly used for fishing rods for spring beam 14. In rods of this character the glass fibers extend longitudinally in a plastic rod, being embedded therein to produce a very strong, springy rod. The resulting device has a light weight, sturdy structure which will stand much abuse and give long service. Being substantially flat, it can be carried in the pocket.

It will be seen by those skilled in the art that I have provided a novel and handy weighing and measuring device which is especially suitable for use by fishermen.

I claim:

A foldable weighing and measuring device comprising first and second elongate strips, a pivot pivotally connecting said strips adjacent a pivoted end of each, said strips being connected in overlapping arrangement with said first strip in front, said device having a folded position with said strips extending in the same direction from said pivot, a length measuring position with said strips extended in opposite directions from said pivot, and a weighing position with said first strip disposed horizontally and said second strip extending downwardly therefrom, said strips having length measuring graduations for measuring the length of an object in said length measuring position, an elongate spring beam rigidly fastened at one of its ends to said first strip adjacent the end thereof opposite said pivot, said beam extending freely along said first strip and having a free end adjacent said pivot, object support means on said beam adjacent the free end thereof, and weigh graduations on said second strip along the path traversed by said free end when said device is in its weighing position and a weight is supported by said beam at said object support means, said weight graduations corresponding to deflections of said beam under different loads.

References Cited in the file of this patent

UNITED STATES PATENTS

| 292,131 | Morrison et al. | Jan. 15, 1884 |
| 2,040,037 | Wily | May 5, 1936 |
| 2,204,595 | Hotson | June 18, 1940 |
| 2,381,086 | Steele | Aug. 7, 1945 |
| 2,633,641 | Fleming | Apr. 7, 1953 |
| 2,697,595 | Walter | Dec. 21, 1954 |

FOREIGN PATENTS

| 227,451 | Germany | Oct. 22, 1910 |
| 79,910 | Switzerland | Jan. 16, 1919 |